United States Patent
Walker

[15] 3,680,933
[45] Aug. 1, 1972

[54] IDLER ROLL STRUCTURE WITH IMPROVED BEARING SEAL ASSEMBLY

[72] Inventor: Donald E. Walker, Yorkville, Ill.
[73] Assignee: Barber-Greene Company, Aurora, Ill.
[22] Filed: Nov. 16, 1970
[21] Appl. No.: 89,775

[52] U.S. Cl. .....................308/187.1, 277/95, 308/20
[51] Int. Cl. .............................................F16c 33/80
[58] Field of Search ....308/187.1, 187.2, 20; 277/65, 277/82, 94, 95

[56] References Cited

UNITED STATES PATENTS

| | | | |
|---|---|---|---|
| 3,420,590 | 1/1969 | Bilocq | 308/20 X |
| 3,494,681 | 2/1970 | Anderson et al. | 308/187.1 |
| 3,345,115 | 10/1967 | Olender et al. | 308/187.1 |
| 3,489,468 | 1/1970 | Buck | 308/187.1 |
| 2,779,639 | 1/1957 | Bainbridge | 308/20 |
| 3,428,373 | 2/1969 | Imse | 308/20 |

*Primary Examiner*—Martin P. Schwadron
*Assistant Examiner*—Barry Grossman
*Attorney*—McDougall, Hersh & Scott

[57] ABSTRACT

A heavy-duty belt conveyor idler roll construction and a heavy-duty seal assembly construction are disclosed. The idler roll is provided with a heavy gauge outer shell and flat end-head members that are welded to the shell at the inner diameter of the shell so that no weld splatter or rough edges are presented on the working surface of the shell. The idler roll is provided with a solid through-shaft surrounded by a grease sleeve which interconnects the bearing assemblies at the roll ends so that a one-point lubrication positively feeds the lubricants to and through the bearing assemblies and air pockets cannot form in the bearing cavities. Shaft supports are closely spaced to the bearing assemblies to reduce shaft deflection and increase bearing life. The seal assemblies include an outer oil-impregnated adjustable retaining member, a synthetic resin face seal member and a reinforced elastomeric lip seal member arranged to provide a five-pass labrinth seal for excluding foreign matter from the bearing assembly and locking lubricants within the bearing assembly and having characteristics of a dirt exclusion seal and a lubricant retaining seal.

7 Claims, 4 Drawing Figures

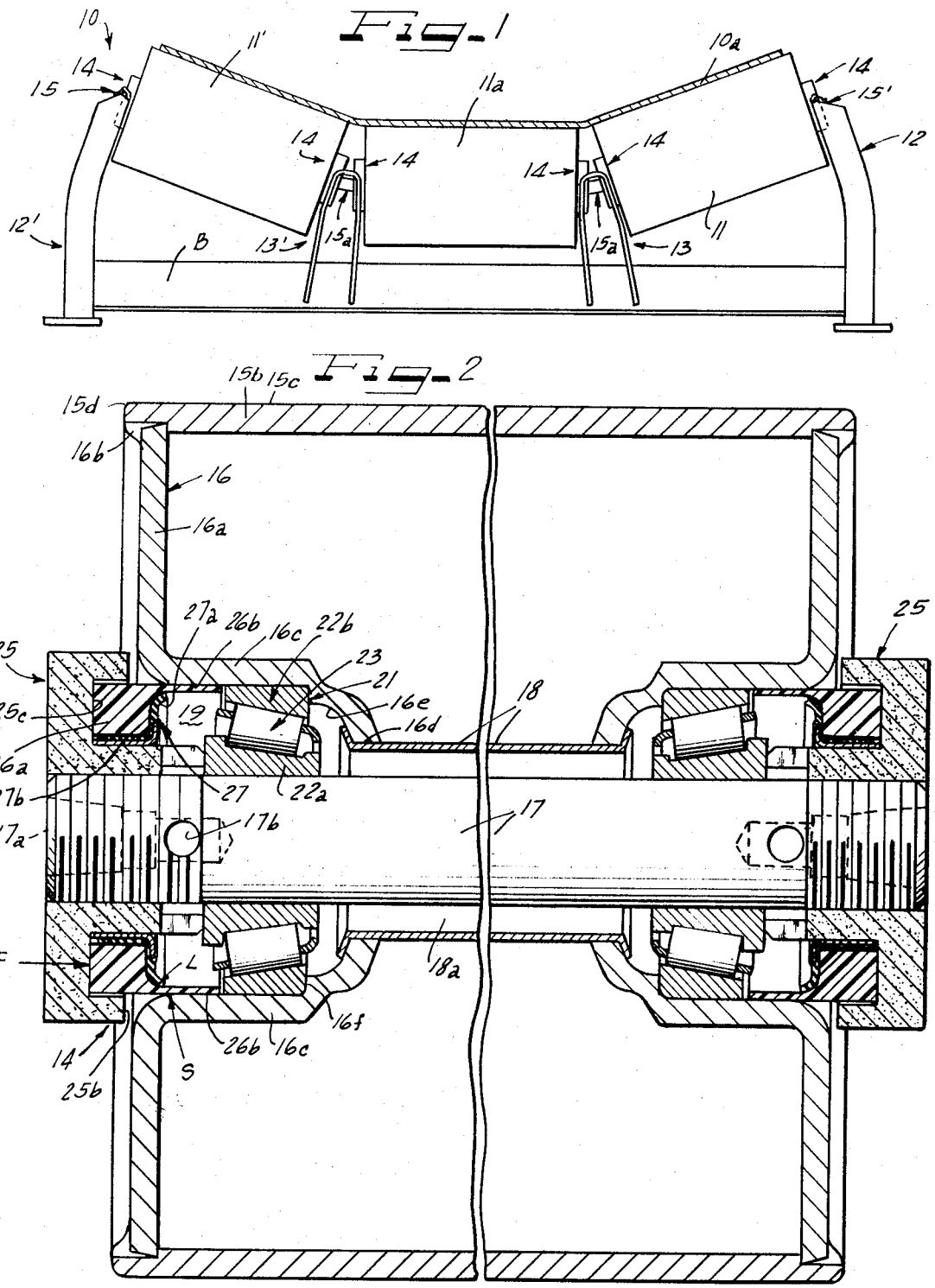

INVENTOR
DONALD E. WALKER

IDLER ROLL STRUCTURE WITH IMPROVED BEARING SEAL ASSEMBLY

BACKGROUND OF THE INVENTION

1. Field of The Invention

This invention relates to conveyor roll assemblies and more particularly to idler conveyor roll constructions having grease and dirt seal assemblies.

Idler conveyor roll constructions having various grease and dirt seal assemblies are known. Generally, end-head assemblies of such known idler roll constructions are recessed inwardly from the roll ends and are somewhat cup-shaped. This structure is disadvantageous since during operation, the recessed portion causes a funnel effect at the area of depression especially at the upper end of the troughing idler end rolls such that contaminants, dust, dirt, etc. are positively brought and maintained within such recessed end-head assembly and in the immediate vicinity of the bearing assemblies, and which provides a greater opportunity for such contaminants to enter the bearing assemblies. Further, known idler roll constructions are provided with outer support members spaced a considerable distance from the center of the bearings for supporting the ends of the roll and to provide a means for adjusting the bearing spacings. Such an arrangement of supported members is disadvantageous because excessive shaft deflection takes place due to the spacing between the support points and the bearing centers and also adversely affect the bearing life due to the resultant mis-alignment.

Known seal assemblies utilized with idler roll bearings fail to provide adequate protection from hostile environment conditions, fail to adequately lubricate the various movable or rubbing members and fail to provide adequate relubrication paths that positively feed lubricants to and through bearing assemblies with the complete avoidance of air pockets. Some of such known seal assemblies utilize an outer dry dirt exclusion seal in combination with inner grease retention seal. These are disadvantageous since the non-lubricated outer seal materially increases roll drag thereby requiring more driving power and the frictional forces on such outer seal materially reduce its operative life. Other known seal assemblies utilize only short labyrinth seals, which do not retain lubricants and allow contaminants to enter. Yet other known seal assemblies provide closed bearing chambers that are subjected to air pocket formation during re-lubrication and require a multi-point lubrication or have exterior lubrication paths that are easily damaged during operation.

SUMMARY OF THE INVENTION

These and other deficiencies are overcome by my invention which provides an improved idler roll construction including essentially flat end-head members that avoids trapping dirt, dust, etc. thereat and including an improved assembly having a plurality of seal members arranged to define a five-pass labyrinth seal and having characteristics of an outer lubricated dirt exclusion seal combined with an inner grease retention seal. The idler roll construction of the invention includes a solid through-shaft and a surrounding lubricating sleeve for one-point lubrication that feeds lubricants in front of and through the bearing assemblies without forming air pockets or the like.

The seal assembly of the invention includes an outer lubricant-impregnated adjustable retaining member having a center portion for attachment with and support of the idler roll through-shaft and an outer flange portion recessed to carry a face-seal member and a lip-seal member. The face-seal member is composed of a synthetic resin material, such as nylon and formed into a skirt-like shape having a central opening for mounting onto the retaining member with a somewhat rectangularly shaped main body portion for insertion into the recessed flange portion of the retaining member with outwardly flared and axially extending seal portions for full face contact with inturned portions of the idler roll end-head members. The lip-seal member is composed of an elastomeric material reinforced by a metal support portion and is formed in to an outwardly flanged ring-like shape for mounting within the central opening of the face seal member for biased contact with portions of the retaining member. The extended flanges of the lip-seal member contact the inner surface of the outwardly flared seal portion of the face-seal member and form a retention lip seal therewith. In assembly, these members define a five-pass labyrinth seal having characteristics of a dirt exclusion seal and grease retention seal.

It is therefor an object of the invention to provide an improved idler roll construction having improved seals for bearing units thereof.

It is a further object of the invention to provide an improved seal assembly having characteristics of a labyrinth gap seal, an exclusion seal and a lip retention seal.

It is a further object of the invention to provide a seal assembly for idler roll bearing units which has a face-seal member automatically resetable to zero clearance with a self-lubricated adjustable retaining member and an extending outwardly flare seal portion forced against an idler roll wall portion, and an elastomeric lip portion of an inner lip seal member, which cooperates with the lip portion to provide a grease retention seal, all of said members being assembled and cooperate define a five-pass labyrinth seal.

It is yet a further object of the invention to provide an improved idler roll construction having flat end-head members that avoid retaining dirt thereat during operation and which idler roll is mounted on a solid through-shaft surrounded by a grease sleeve interconnecting the bearing assemblies at the roll ends so as to provide a one-point lubrication construction and combined with improved seal assemblies which define a five-pass labyrinth seal having characteristics of a dirt exclusion seal and a lubricant retaining seal.

Other objects, features and advantages of the invention will become readily apparent from the following description of certain preferred embodiments thereof, taken in conjunction with the accompanying drawings, although variations and modifications may be effected without departing from the spirit and scope and novel concepts of the disclosure.

BRIEF DESCRIPTION OF THE DRAWINGS

FIG. 1 is a diagrammatic side elevational view illustrating a trough-type arrangement of idler conveyor roll construction in accordance with the principles of the invention and utilizing the improved seal assemblies thereof;

FIG. 2 is an enlarged cross-section view, broken away in part, illustrating an assembled idler roll and seal assembly of the invention;

DESCRIPTION OF THE PREFERRED EMBODIMENTS

Figure 3:
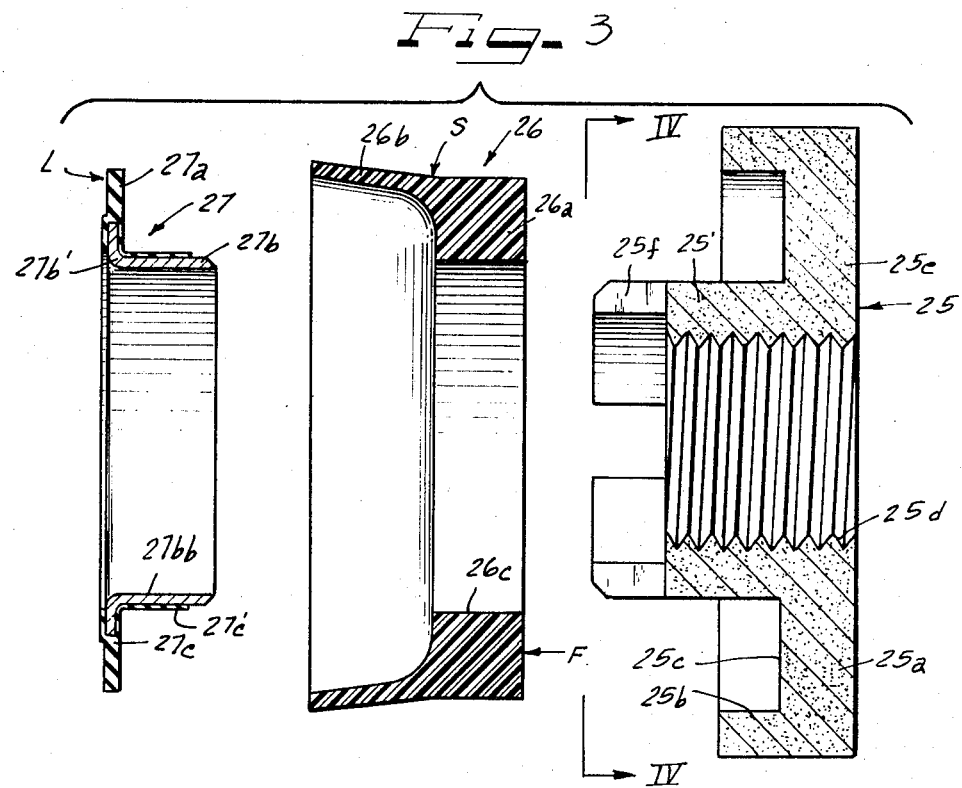
FIG. 3 is an exploded cross-section view illustrating the arrangement of the seal assembly of the invention.

As shown in the drawings, reference numeral 10 indicates a trough-type conveyor belt carrier or assembly having inclined end rolls 11 and 11' and a horizontal intermediate roll 11a. The angle of inclination of the end rolls 11 and 11' can be selected over a wide range from about 20° to about 45°, depending on the type of material to be carried and the characteristics of the required belting. An endless conveyor belt 10a of a suitable composition is carried along the rotating peripheral or working surfaces of the rolls 11, 11a and 11'. A drive means (not shown) may be provided to drive and regulate the speed of the belt as desired. The end rolls 11 and 11' are maintained in position by an end-stand construction generally indicated at 12 and 12' of any desired type. The intermediate roll 11a is maintained in position by vertical stands 13 and 13' of a suitable construction anchored to a base support means B and provided with interconnecting lubrication passageways 15a which allows a lubricant to pass from one roll to the next roll. Each of the rolls 11, 11a and 11' are provided with bearing assemblies 14 allowing the rolls to be rotated about their axes. A lubrication fitting 15, shown at the left end of the assembly 10, may be located at either end thereof, and a relief fitting 15', shown at the right end of the assembly is provided at the exposed end of the outer rolls 11 or 11'. If desired, only the lubrication fitting need be provided and the opposite end plugged. As described later, lubricant may be applied to one such lubrication fitting 15 and positively fed into and through the immediately adjacent bearing assembly, through that particular roll and into its opposite bearing assembly and then through lubrication passageway 15a and into the next bearing assembly, etc.

Since the idler rolls of the invention can be of substantially identical construction, the details of only one such roll are illustrated and discussed.

The idler roll 11 is constructed of a relatively heavy gauge metal shell 15b having a smooth outer work surface 15c and rounded or chamfered end edges 15d. This type of idler roll shell provides a smooth support for a conveyor belt and does not have any rough or sharp corner edges or the like that can damage a belt under load conditions. The shell 15b is substantially hollow and is enclosed from the environment by suitably attached end-head members 16.

As shown, end-head members 16 are essentially flat along the main body portion 16a thereof and are aligned to perpendicularly and concentrically abut near the end edges 15d of the shell 15b and along the inner diameter of the shell. As shown, the shell 15b may be slightly cut away along the inner diameter at the edges thereof for more secure attachement and improved alignment of the end-head members. This alignment of the end-head member with the roll shell allows a weld bead or the like 16b to anchor each of the end-head members 16 to the inner diameter of the shell 15b along opposite ends thereof and avoid weld splatters on the work surface of the shell 15b. The perpendicular main body portion 16a of the end-head member 16 prevents the formation of a funnel or the like along the idler roll ends during rotation, which would otherwise tend to form and positively trap dust, dirt, and other similar contaminant particles in this area and in the immediate vicinity of the bearing assemblies generally indicated at 14.

Each of the end-head members 16 also have an inwardly turned and formed cup-like portion 16c terminating at an end 16d so as to define an interior chamber 16e. The ends 16d are anchored, as by pressure fitting or the like onto a lubricant sleeve member 18, which interconnects opposite interior chambers 16e with each other and provides a passageway 18a for lubricants throughout the length of a roller. The passageway 18a also functions as a reservoir for lubricants so that longer periods of time can elapse between lubrications without any adverse effects.

A solid through-shaft or axle 17 loosely fits within the sleeve member 18 and extends through the internal chambers 16e. Extensive investigation has shown that solid shafts are able to withstand substantially more stress, i.e. 10 percent or more, than conventional stub or hollow shafts. This is particularly important in heavy-duty applications wherein heavy weight materials are encountered. Further, such solid shafts are better able to resist deflection due to the weight of the rollers and/or the material being conveyed.

The solid shaft 17 is provided with a pair of opposed axially outwardly opening recesses 17a each having radially opening end bores 17b so that lubricant can be fed into the recess 17a and discharged through the part 17b into a frontal area 19 of the interior chambers 16e and through the internal chamber 16e and into the sleeve chamber 18a. As will be appreciated, the outwardly opening recesses 17a may be provided with conventional lubrication fittings not shown here. This arrangement of lubrication passages allows a one-point application of a lubricant and positively feeds the lubricant into and through all hollow chamber portions and to all bearing assemblies with no formation of an air pocket in the vicinity of the bearing units. The positioning of the radially opening bores 17b in the frontal area 19 of the chamber 16e insures that lubricants will first enter this area and force any air rearwardly and into sleeve passageway 18a so that no air pocket or the like forms in the vicinity of the bearing units 23. In a single roll of this type of construction any air is forced from one end of the roll into the other and out the opposite bore. In a plurality of interconnected rolls, such as shown at FIG. 1, air is similarly forced from one roll to the other until it reaches the opposite end roll.

A pair of opposed bearing roll assemblies 21 are housed within the respective interior chambers 16e. Each bearing assembly has an inner race ring 22a positioned on a peripheral portion of the shaft 17 and an outer race ring 22b positioned on an inner wall or cup-like portion 16c of the end-head member 16 so as to abut a shoulder portion 16f thereof. A plurality of anti-friction members 23, such as the shown tapered roll bearings, are suitably disposed between the inner and outer race rings 22a and 22b respectively, and are in working relation therewith. In this manner, the rolls are mounted for free rotation about shaft 17 and the radial load on the idler roll assemblies is transmitted by the end-head members 16 through the bearing assemblies 21 to the solid shaft 17. It will be noted that the bearing assemblies 21 are positioned relatively close to the respective ends of the shaft 17 so as to be in close proximity to its points of support and thereby minimize deflection and mis-alignment.

Figure 4:
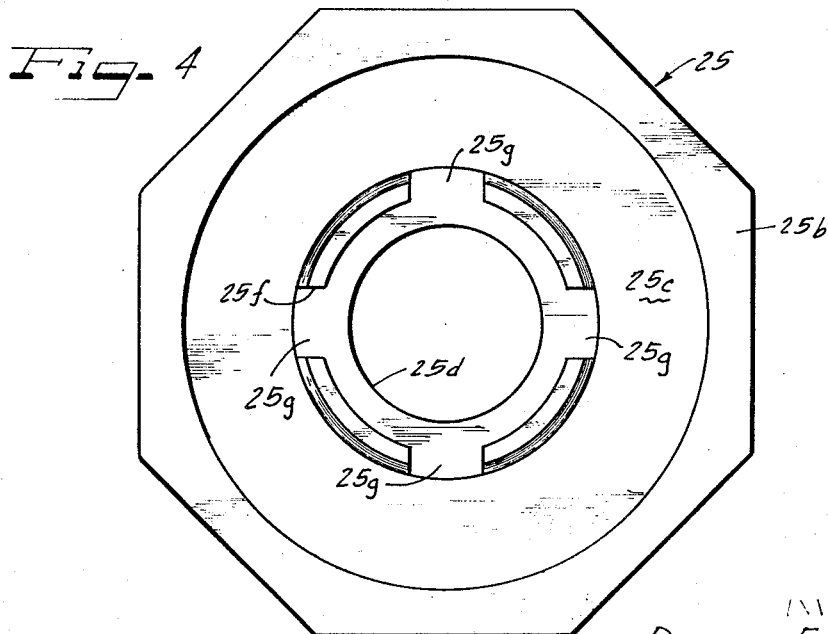
FIG. 4 is an elevational view taken substantially along lines IV—IV of FIG. 3 illustrating additional details of an outer seal assembly member of the invention.

An outer adjustable retaining member 25 is suitably secured onto the respective ends of the shaft 17, as by press-fitting or by threads. The retaining member 25 is somewhat T-shaped in cross section, as best seen at FIG. 3, having a stem portion 25' with a center opening 25d, which can be threaded as shown, for supporting shaft 17 and providing proper bearing adjustment. An outer flange portion 25a of member 25 extends radially away from the central opening 25d and terminates in axially inwardly extending side flange portion 25b so as to define a receiving recess 25c along the underside of the member 25. The inner axial end of the member 25 is stepped down to define protruding discontinuous spacing means 25f. As shown, in assembly (FIG. 2) spacing means 25f serve to position the inner race rings 22a. As shown in FIG. 4, a plurality of openings 25g are provided between the spacing means 25f to permit passage of lubricants therethrough and into the frontal areas 19 of the interior chambers 16e.

The adjustable retaining member 25 is preferably composed of a compressed metal powder having high mechanical strength and a network of interconnected pores or fine capillary-like fissures or openings throughout its body enabling a viscous lubricant, such as an oil or the like, to completely impregnate the body of thereof and remain there over extended periods of time. Suitable metal powder, such as steel or iron powder, is compressed under high pressure, as in an industrial punch device, into the desired shape by known techniques and is then subjected to sintering conditions to improve its mechanical characteristics. Such a powdered metal member can be machined where necessary, although proper choice of dies eliminates the need for machining. The formed retaining member (sometimes referred to as a sealing nut) is immersed in a suitable lubricant bath for a period of time sufficient for the lubricant to uniformly impregnate all of the minor openings within the body thereof and thereby form a lubricant-impregnated retaining member. Such a lubricant-impregnated member will always have lubricated surfaces as oil is pulled from the lubricant by capillary action on demand.

A face-seal member 26 is adapted for insertion between each of the retaining member 25 and each of the cup-like portions 16c of the end-head members 16 and onto the stem portion 25' of member 25. A main body portion 26a is formed to readily fit within the receiving recess 25c of retaining member 25 with surface F of seal 26 forming a zero gap face seal with surface 25c of adjustable retaining member 25. The face seal member 26 rotates with the cup-like portion 16c of the end head members 16 and the shell 15b. The face seal 26 resets upon lubrication to zero clearance between surface F of main body 26a and the receiving recess 25c of retaining member 25 thus adjusting for any wear at this relative motion point, i.e., surface F and surface 25c. An outwardly flared axially extending seal portion 26b forms a continuation of the outer peripheral side surface of the main body portion 26a and defines a seal surface S which is adapted to come into direct contact with the inner surface of the cup-like portion 16c with a press fit therebetween. In other words, seal surface S of member 26 is somewhat skirt-shaped having a central opening 26c of an inner diameter slightly larger than the outer diameter of the stem portion 25' and the outer shank surface 27c' of lip seal member 27 and has in cross-section a rectangularly shaped main body portion 26a integrally joined with outwardly flared axially extending side portions 26b. The inner diameter of the outwardly flared side portions 26b is preferably greater than the inner diameter of the central opening 26c thereof, although no exact relationship is needed. The only requirement being that the cross-sectional thickness of the outwardly flared portion 26b be at a dimension sufficient to provide resistance to deflection. The degree of flaring can also be varied over a wide range and the only requirement being that it be flared enough to positively urge a substantial portion of the seal surface S against the wall portion 16c. In other words, on assembly the flared portions 26b are self-biased against the wall portion 16c.

The face seal member 26 is composed of a substantially environmentally inert and mechanically durable synthetic resin material 26a. A number of suitable synthetic resin materials are known and include polytetrafluoroethylenes, polyurethanes, polypropylenes, polyamides, mixtures thereof, etc. A material especially well suited for use is available under the trade name "Zytel No. 101" nylon.

A lip-seal member 27 is adopted for insertion between the stem portion 25' of the member 25 and an inner wall of the flared portion 26b of member 26 so as to form a biased retaining lip seal L. As best seen at FIG. 2, the lip seal L is formed between an inner wall of the flared seal portion 26b and the biased outer portion 27a of member 27 so that internal axial pressure against portion 27a reinforces the seal and insures that a lubricant or the like cannot escape.

The lip-seal member 27 is formed of a reinforcing portion 27b and an elastomeric flexible portion 27c. As shown at FIG. 3, the reinforcing portion 27b is generally ring-shaped having a central opening 27b with an inner diameter generally matching, in a press-fit or the like relation, the outer diameter of stem portion 25'. One end of portion 27b is provided with a radially outwardly extending flange 27b'. The portion 27b is composed of a suitable reinforcing material, such as a metal. The flexible portion 27c is composed of a suitable elastomeric synthetic rubber material, such as available under the trade name "Buna-N" rubber and formed into a somewhat Y-shape, with one portion 27c' of the fork longer than the other, and the opening between the fork portions being adapted to snugly receive flange 27b' of the reinforcing member 27b. The flexible member is mounted onto the flange member 27b so that the longer fork portion 27c' contacts the outer surface of member 27b. Suitable lubricant-impervious bonding agents can be provided to bond the flexible member 27c to the reinforcing member 27b so that a unitary structure is achieved.

In assembly, the adjustable retaining member 25, the face-seal member 26 and the lip seal member 27, in cooperation with the end-head member wall 16c define a five-pass labyrinth seal which contaminants must overcome before reaching bearing units 23. In order to penetrate this five-pass labyrinth seal, the contaminants must first avoid being thrown off by the rotating idler roll and the flat end-head members. The contaminants must then enter the relatively small gap between the peripheral end of flange portion 25b and the end-head member wall 16a. Next the contaminants must enter and travel though the gap between the inner wall of flange portion 25b and an outer wall portion of face-seal member 26. At end or troughing rolls, as rolls 11 and 11' of FIG. 1, where the bearing assemblies 14 are least protected from contaminants, this second gap or pass is angled upwardly and against the force of gravity, thereby further increasing its effectiveness. It will be appreciated that contaminants cannot enter between wall portion 16c and seal portion 26b at the seal surface S because portion 26b is self-biased against this wall as a result of its outwardly flared configuration.

The third gap or pass of the five-pass labyrinth seal has a zero clearance and is defined by the inner wall of the receiving recess 25c and surface F of face-seal member 26. This zero-clearance dirt exclusion seal is self-lubricated by the contact between the lubricant-impregnated member 25 and the adjacent synthetic resin face of member 26. Lubricants in the interior chamber 16e provide a continuous supply thereof for the member 25 by capillary attraction and the interconnecting pores within member 25 allow the lubricant to migrate and be uniformly distributed throughout the body thereof. This third gap is automatically reset to a zero clearance by internal lubricant pressure each time a lubrication takes place. The fourth gap or pass of the five-pass labyrinth seal runs generally parallel to the shaft 17 and is defined by the inner bore surface 26c of face seal member 26 and the outer shank surface 27c' of lip seal member 27. The fifth gap is defined between the biased outer portion 27a of lip seal member 27 and the inner surface of the flared skirt shaped portion 26b of face seal member 26. Extensive demonstrations have shown that this type of five-pass labyrinth seal can withstand extremely hostile environmental conditions, such as a blast furnace area handling hot wet sintered cake and being constantly exposed to sinter dust, acid fumes, water spray, etc. for extremely long periods of time without any adverse effect or allowing any contaminants to enter through the seal and damage the bearing units. Of course, other hostile environmental conditions are also readily resisted.

Thus, it will be seen that the invention meets all of its objects and provides an improved idler roll construction having flat end-head members combined with an improved five-pass labyrinth seal having characteristics of a dirt exclusion seal and a grease retention seal. The dirt exclusion face seal is self-lubricating and automatically resetable to a zero clearance during re-lubrication operations Lubrication passageways are provided in cooperation with the solid through-shaft of the idler rolls to positively feed lubricants from a point of entry into bearing chambers ahead of the bearing units, forcing any air ahead of the lubricants as it travels through the bearings and into a sleeve interconnecting opposite ends of the rolls. One-point lubrication of a plurality of rolls, such as utilized in a trough-type conveyor belt assembly, is provided by interconnecting the plurality rolls with lubricant passageways therebetween whereby lubricant can pass from one roll into the next roll and avoid air pocket formation.

It will be understood that modifications and variations may be effected without departing from the spirit and scope and novel concepts of the invention.

I claim as my invention:

1. In an idler roll construction, the combination of:
   an outer roll shell having a smooth working surface and rounded end edges;
   a pair of end-head members attached along an inner end surface of such said shell and having a substantially flat configuration for a substantial portion thereof aligned in a substantially perpendicular and concentric relation to said roll shell, and in-turned wall portions shaped to define a pair of opposed interior chambers within said shell along a central axis thereof opening axially outwardly at the ends of said shell;
   a solid through-shaft extending through said interior chambers and having at its respective opposite ends a pair of opposed axially outwardly opening lubricant passages, each having radially opening cross-bores opening into a frontal area of each of said interior chambers;
   a hollow sleeve member mounted concentrically over said shaft and attached to said in-turned wall portions of each of said end-head members so as to define an interconnecting passageway between said interior chambers;
   a pair of anti-friction means mounted within said interior chambers, respectively, in areas adjacent and inwardly of said cross-bore openings;
   a pair of seal assembly means mounted on respective ends of said shaft adjacent and outwardly of said cross-bores such that lubricant entering one of said lubricant passages must pass through both of said anti-friction means as it is being forced to the other of said lubricant passages; and
   each seal assembly including at least one seal member responsive to lubricant pressure so as to increase effectiveness of the seal formed thereby for preventing passage of the lubricant from such frontal area of the associated chamber to the exterior of such seal assembly.

2. An idler roll construction as defined in claim 1, wherein each of the seal assemblies includes a self-lubricating adjustable retaining member, a face-seal member having a surface in coextensive sealing engagement with a surface of said retaining member, and a lip-seal member having surfaces in respective coextensive sealing engagement with surfaces of said retaining member and said face-seal member thereby to define a multi-pass labyrinth seal.

3. An idler roll construction as defined in claim 2, wherein the self-lubricating adjustable retaining means is composed of a powdered metal compressed into a shape so as to have a plurality of minute interconnecting pores throughout its body capable of being impregnated by a lubricant, and a lubricant impregnated within said interconnecting pores.

4. An idler roll construction as defined in claim 3, wherein the retaining member is provided with a plurality of discontinuous spacing means at an axial inner end thereof.

5. An idler roll construction as defined in claim 2, wherein the face-seal member is composed of a polyamide resin material.

6. An idler roll construction as defined in claim 2, wherein the retaining member includes radially extending flanges with in-turned end portion so as to define a receiving recess along an inner surface of said member, the face-seal member includes a body portion fitting within said receiving recess and having an axially extending outwardly flared side portion for full surface contact with the in-turned wall portion of the end-head members, and the lip-seal member includes a reinforced portion fitting onto the retaining member and radially extending flexible elastomeric portions joined with said reinforced portion for biased contact with said outwardly flared side portions of the face-seal member.

7. In a conveyor idler roll construction, the combination of:
- an outer idler roll shell formed of a relatively heavy-gauge metal and having a smooth peripheral surface and rounded end edges;
- a pair of end-head members formed of a relatively heavy-gauge metal, each being rigidly attached to inner end surfaces of said shell and having substantially flat main walls substantially perpendicularly aligned with said shell and inwardly turned subsidiary walls shaped to define an interior chamber opening outwardly at the respective axial ends of said shell;
- a solid through-shaft positioned within said shell and extending through said interior chambers, said shaft having a pair of opposed axially outwardly opening passages for admitting a lubricant, each of said passages having radially opening bores providing communication between a frontal area of each of said interior chambers and said passages;
- a hollow sleeve member concentrically mounted over said through-shaft and rigidly attached to opposed subsidiary walls of said end-head member so as to define an interconnecting passageway between said interior chambers;
- a pair of opposed anti-friction bearing units each mounted within said interior chambers and in working relation with said through-shaft, each of said bearing units being positioned in an area of each respective chamber behind said frontal area; and
- a pair of seal assemblies each mounted on opposite outward ends of said through-shaft in relatively closely spaced relation to said bearing units, each of said seal assemblies comprised of:
  - an outer lubricant-impregnated adjustable retaining member in support contact with an end of said through-shaft and having a radially extending flange with an axially in-turned end portion in closely spaced relation to a portion of the flat main wall of one of said end-head members, said radial flange and in-turned end portion defining a receiving recess having at least one lubricated peripheral wall, and an axial inner end of said retaining member having a plurality of discontinuous spacing means extending into said frontal areas of each of said interior chambers,
  - a face-seal member having a shirt-like shape with a cross-sectional rectangular body portion adapted to fit within said receiving recess and outwardly flared axially extending side portions for biased full face contact with the inturned wall portion of said end-head member, said face-seal member being composed of a synthetic resin material, and
  - a lip-seal member having a ring-shaped reinforcement portion with a retaining flange at one end thereof and a circularly-shaped flexible sealing portion integrally joined to said retaining flange for biased contact with said outwardly flared side portion of the face-seal member.

* * * * *